Patented Aug. 22, 1944

2,356,549

UNITED STATES PATENT OFFICE 2,356,549

MANUFACTURE OF PURIFIED RUBBER

Godfried Johan van der Bie, Buitenzorg, Java, Netherland East Indies; vested in the Alien Property Custodian No Drawing. Application August 16, 1941, Serial No. 407,230. In the Netherlands May 7, 1940

2 Claims. (Cl. 260—815)

This invention relates to manufacture of purified rubber; and it comprises a process wherein a water-soluble, metal-complex-forming reagent, such as an alkali metal cyanide, is added to an aqueous dispersion of rubber, whereby any insoluble metal compounds present are converted into soluble metal complexes, followed by sepparation of the aqueous phase, including said soluble metal complexes, from the rubber. The invention also includes the purified rubber resulting from the said process, having a content of copper, for example, not substantially exceeding 0.2 to 0.25 mg. per 100 grams of rubber; all as more fully hereinafter set forth and as claimed.

It is known that small amounts of metal compounds, such as copper, manganese and iron, exert a detrimental influence on the durability of raw or vulcanized rubber. Accordingly in practice, a limit has been set for the permissible amount of each of these metals. Furthermore it is known that in rubber dispersions small amounts of compounds of the above mentioned metals occur. Some natural latices may even contain relatively high copper contents.

The metal compounds present in latex are usually partly in the dissolved and partly in an undissolved condition. In the undissolved condition these compounds are adsorbed on the rubber particles or are present in flocculated form, suspended in the serum or precipitated on or in the rubber particles.

The object of the present invention is to solubilize and remove insoluble detrimental metal compounds of this type occurring in rubber, especially in rubber dispersions. The term "rubber" includes rubber of Hevea brasiliensis, guttapercha, balata, djelutong, abiurana and knodang throughout the following description and in the claims.

When dispersions of rubber are coagulated about half of the metal content present goes into the serum, the other half remaining in the rubber. The metal compounds, especially the copper compounds, exert a detrimental influence on the aging properties of the rubber, which detrimental influence can be partly neutralized or reduced by substances occurring in natural rubber dispersions that is, by the so-called anti-oxidants, which protect the rubber against depolymerization and oxidation. But purified rubber, for example, rubber used for electrical purposes is generally free from these anti-oxidants owing to their removal during purification. The detrimental influence of the prejudicial metal compounds is therefore greatly enhanced.

In those methods of purifying latex which involve boiling of the latex with an alkali, the metal compounds present are nearly completely converted, during the resulting hydrolysis, into compounds which form insoluble combinations when the latex is coagulated. In these methods therefore a substantial part of the metals, such as copper, which are present in the original latex, remain in the purified rubber. It is probable that in some cases the copper is precipitated in the form of sulfidic compounds, by reaction with the sulfur ions formed by hydrolysis of the non-rubber constituents present.

In order to produce a durable rubber it is important to obtain a product with a low content of detrimental metals and especially with a low copper content. It is therefore highly desirable to reduce the metal content of rubber as far as possible, and this applies especially to rubber types having a high initial metal content. A high metal content may be due to several different causes, e. g. to the high metal content of the natural latex or to impurities which may have been introduced into the latex during the pretreatment. Synthetic dispersions of rubber usually contain detrimental metal compounds originating from the apparatus.

Dissolved metal compounds can be removed with the serum constituents of latex by creaming, centrifugal action or other known operations. Any metal compounds occurring in the latex in the form of flocs which tend to settle by gravity can be removed by clarification.

The present invention relates to a process whereby the metal compounds, especially the copper compounds, present in the latex, on or in the rubber particles in undissolved condition, are converted into soluble compounds and then removed by methods known per se for the removal of soluble compounds from rubber dispersions. According to the invention the solubilization of the metal compounds is accomplished by converting the metals into soluble complex metal compounds and removing these solubilized compounds, e. g. by dialysis, creaming, centrifugal action, adsorption or other known methods. A very suitable method for the conversion of the metal compounds present in latex into complex soluble compounds comprises the treatment of the rubber dispersion with a soluble cyanide, such as an alkali metal cyanide. Copper as well as iron and manganese compounds are solubilized according to this process.

In the absence of appreciable sulfide-ions in the liquid the copper compounds can also be converted into other complexes. For example, tartrates, citrates, polyhydric alcohols and other soluble polyhydric organic compounds form complexes and tend to solubilize any copper present.

The solubilization of the insoluble metal compounds can, if desired, be effected while other operations are being conducted, e. g. during hydrolysis with alkali-lye or during other purification operations. The solubilization of detrimental metal compounds in the rubber dispersions must ordinarily be effected in practice in an alkaline medium in order that the dispersion may remain stable. The removal of the metal complexes from the rubber must likewise be effected in an alkaline medium and therefore before the coagulation, which is usually conducted in an acid medium.

By employing an alkali cyanide to produce complex formation and solubilization of the metal content, as described above, the copper content, for example, of the rubber can be decreased to ¼ or less of the original content. The amount of cyanide used is preferably as low as possible. It has been established by experiment that it is possible to obtain a considerable decrease of the copper content when small amounts, such as 30 mg. of cyanide per liter are used. Such an addition will result in a decrease of the copper content from an initial value of e. g. 0.86 mg. per 100 g. to about 0.51 mg. copper per 100 g. of rubber. In practice amounts of 0.1 to 0.2 g. cyanide per liter are to be recommended. When the last mentioned amounts are added the copper content of such a rubber can be reduced to as low as 0.23 mg. of copper per 100 g. of rubber. The other metals are reduced in a corresponding manner.

Heating of the dispersion to which the cyanide has been added promotes the solution of the metals such as copper and with such heating the use of smaller amounts of cyanide is sufficient. Without heating, larger amounts of cyanide must be used in order to produce a final metal content within the range of 0.2 to 0.25 mg. of copper per 100 g. of rubber. The dispersions may be heated to temperatures somewhat below or at the boiling point, for example.

The removal of solubilized copper can be accomplished by various methods, e. g. by centrifugal action, creaming, dialysis adsorption, ultra-filtration etc. The removal by creaming with the aid of Konnyaku starch is especially suitable, since a considerable decrease of the copper content of the final rubber product is obtained thereby. Possibly the copper is adsorbed by the Konnyaku starch and the unexpected decrease of the copper content is possibly due to such an adsorption.

This application is a continuation-in-part of applicant's prior application for patent on a process for the removal of noxious metal compounds from rubber or substances similar to rubber, and from dispersions thereof, filed February 14, 1941, Serial No. 378,942.

What is claimed is:

1. In the removal of insoluble metal compounds from aqueous rubber dispersions, the process which comprises mixing with such a dispersion a water soluble cyanide in amount ranging from about 0.03 to 0.2 mg. per liter, thereby forming soluble complex metal cyanides from the metal impurities present, heating the mixture, thereby enhancing the formation of said metal complexes and then separating a fraction containing serum and said soluble metal complexes, from the said dispersion.

2. In the purification of latex, the process which comprises adding to a latex a small amount of an alkali metal cyanide ranging from about 0.03 to 0.2 mg. per liter, thereby forming soluble complex metal cyanides from the insoluble copper, manganese and iron compounds present, heating the mixture to a temperature ranging up to its boiling point to increase the formation of said metal cyanides and then separating a fraction containing serum and said soluble metal cyanides, thereby producing a concentrated and purified latex fraction free from insoluble copper, manganese and iron compounds.

GODFRIED JOHAN van der BIE.